United States Patent
Pries et al.

(10) Patent No.: US 11,997,147 B1
(45) Date of Patent: May 28, 2024

(54) SIP TRUNK CONFIGURATION DIAGNOSTICS

(71) Applicant: AVOXI, Atlanta, GA (US)

(72) Inventors: Gregory William Pries, Smyrna, GA (US); Alan Jay Graham, Lunenburg, MA (US); Jeffery Wayne Cook, Eagle Mountain, UT (US); Nicholas James Goodyear, Johannesburg (ZA); John Jordan Vardell, Salt Lake City, UT (US)

(73) Assignee: AVOXI, INC., Atlanta, GA (US)

( * ) Notice: Subject to any disclaimer, the term of this patent is extended or adjusted under 35 U.S.C. 154(b) by 0 days.

(21) Appl. No.: 18/469,764

(22) Filed: Sep. 19, 2023

(51) Int. Cl.
*H04L 65/1104* (2022.01)
*H04L 41/085* (2022.01)

(52) U.S. Cl.
CPC ........ *H04L 65/1104* (2022.05); *H04L 41/085* (2013.01)

(58) Field of Classification Search
CPC ............................ H04L 65/1104; H04L 41/085
See application file for complete search history.

(56) References Cited

U.S. PATENT DOCUMENTS

| | | | | |
|---|---|---|---|---|
| 9,213,533 | B1* | 12/2015 | Butaney | H04L 65/1053 |
| 2017/0085596 | A1* | 3/2017 | Hopson, III | H04L 65/1104 |
| 2017/0237851 | A1* | 8/2017 | Hassan | H04L 43/087 |
| | | | | 370/252 |
| 2019/0089750 | A1* | 3/2019 | Hassan | H04L 45/245 |
| 2019/0306203 | A1* | 10/2019 | Jokela | H04L 65/1108 |

OTHER PUBLICATIONS

Avaya. Application notes for configuring SIP trunking using Verizon business IP contact center VoIP inbound and Avaya IP office Release 7—Issue Jan. 1, 2011. pp. 1-59.
Kavulya, S.P., Joshi, K., Hiltunen, M., Daniels, S., Gandhi, R., Narasimhan, P. (2011). Draco: Top-down statistical diagnosis of large-scale VoIP networks. Carnegie Mellon University, AT&T Labs-Research. 2011. pp. 1-21.
Titus, T. Avaya Engage. 602 SIP trunk monitoring & troubleshooting best practices.
Website. SIP tester tutorial. Retrieved from: http://startrinity.com/voip/siptester/SipTesterTutorial.aspx.

(Continued)

*Primary Examiner* — Philip C Lee
(74) *Attorney, Agent, or Firm* — Carlson, Gaskey & Olds, P.C.

(57) ABSTRACT

A system for diagnosing a session initiation protocol (SIP) trunk configuration may include one or more processors coupled to memory. The one or more processors may be collectively operable to execute a diagnostics environment. The diagnostics environment may include an interface module operable to access data associated with a configuration including a set of configuration settings assignable to a SIP trunk. The set of configurations settings may be associated with respective layers and/or sublayers of a network connectivity model. A comparison module may be operable to determine a configuration status of one or more of the layers and/or sublayers associated with the SIP trunk. A display module may be operable to cause the configuration status to be displayed in a user interface. A method of diagnosing a SIP trunk configuration is also disclosed.

20 Claims, 5 Drawing Sheets

(56) References Cited

OTHER PUBLICATIONS

Website. SIP tester usage diagrams. Retrieved from: https://startrinity.com/VoIP/SipTester/SipTesterUsageDiagrams.aspx.
Website. Total Network Visability Blog: Troubleshooting SIP trunks. 2019. Retrieved from: https://www.pathsolutions.com/blog/troubleshooting-sip-trunks.
Cisco. Cisco unified communications manager managed services guide, release 8.0(1). Chapter 5, pp. 5-37-5-46.
Oracle (2013). Oracle Communications Enterprise Trunk Manager: Service Provider Configuration Guide.
Arnarson, O. (2018). SIPvestigator: A CLI based SIP session diagnostics utility. Retrieved from: https://skemman.is/bitstream/1946/30432/1/SIPvestigator.pdf.

* cited by examiner

SIP TRUNK CONFIGURATION DIAGNOSTICS

BACKGROUND

SIP trunking utilizes the Session Initiation Protocol (SIP) to establish and manage communication sessions over the internet. SIP trunking may be utilized to transmit voice, video, and other multimedia content through an IP-based network. The SIP trunk administrator may be presented with many configuration options for establishing the SIP trunk.

SUMMARY

A system for diagnosing a session initiation protocol (SIP) trunk configuration may include one or more processors coupled to memory. The one or more processors may be collectively operable to execute a diagnostics environment. The diagnostics environment may include an interface module operable to access data associated with a configuration including a set of configuration settings assignable to a SIP trunk. The set of configurations settings may be associated with respective layers and/or sublayers of a network connectivity model. The set of configurations settings may be selectable from respective groups of configuration options. A comparison module may be operable to access a set of supported configuration options associated with the respective layers and/or sublayers of the network connectivity model. The set of supported configuration options may be associated with fewer than all configuration options of the respective groups of configuration options. The comparison module may be operable to determine a configuration status of one or more of the layers and/or sublayers associated with the SIP trunk in response to comparing the set of configuration settings to the set of supported configuration options. A display module may be operable to cause the configuration status to be displayed in a user interface.

In any implementations, the interface module may be operable to access the data in response to initiation of at least one call associated with the SIP trunk.

In any implementations, the user interface may include a list associated with the layers and/or sublayers. The display module may be operable to cause the display of one or more indicators associated with the configuration status of the respective layers and/or sublayers in the user interface.

In any implementations, the one or more indicators may be selectable from a set of indicator types. The indicator types may include a success indicator and a failure indicator.

In any implementations, the one or more indicators are associated with one or more respective text fields, and the display module is operable to cause display of text in the one or more text fields associated with the set of supported configuration options.

In any implementations, the groups of configuration options may define a set of selectable combinations associated with two or more of the layers and/or sublayers. The set of supported configuration options may define a set of supported combinations associated with two or more of the layers and/or sublayers. The set of supported combinations may be fewer than all selectable combinations of the set of selectable combinations. The comparison module may be operable to determine the configuration status in response to comparing the set of configuration settings to the set of supported combinations.

In any implementations, the interface module may be operable to access the data from a buffer. The buffer may be operable to store a copy of traffic associated with one or more calls between the SIP trunk and a telephone network.

In any implementations, the comparison module may be operable to determine the set of configuration settings based on the data in the buffer.

In any implementations, the one or more processors may be associated with a host computer. The host computer may be remote from the SIP trunk.

In any implementations, the host computer may be operable to interconnect the SIP trunk and a telephone network.

A method of diagnosing a session initiation protocol (SIP) trunk configuration may include accessing data associated with a SIP trunk. The SIP trunk may be defined according to a configuration including a set of configuration settings associated with respective layers and/or sublayers of a network connectivity model. The set of configuration settings may be selectable from respective groups of configuration options. The method may include determining a configuration status of the SIP trunk based on the data, which may include comparing the set of configuration settings to a set of supported configuration options. The set of supported configuration options may be associated with the respective layers and/or sublayers of the network connectivity model. The set of supported configuration options may be associated with fewer than all configuration options of the respective groups of configuration options. The method may include displaying the configuration status of the layers and/or sublayers associated with the SIP trunk in a user interface.

In any implementations, the data may be associated with at least one call between the SIP trunk and a telephone network.

In any implementations, the user interface may include a set of localized regions associated with the respective layers and/or sublayers. The displaying step may include updating indicators associated with the respective localized regions according to the determined configuration status.

In any implementations, the set of localized regions may be arranged according to an order of layers and/or sublayers of the network connectivity model.

In any implementations, the displaying step may include displaying information in text fields in the respective localized regions associated with the determined configuration status.

In any implementations, the information in the text fields may be associated with one or more of the supported configuration options.

In any implementations, the method may include repeating the determining and displaying steps in response to a change in the set of configuration settings.

In any implementations, the groups of configuration options may define a set of selectable combinations associated with two or more of the layers and/or sublayers. The set of supported configuration options may define a set of supported combinations associated with two or more of the layers and/or sublayers. The set supported combinations may be fewer than all selectable combinations of the set of selectable combinations. The step of comparing the set of configuration settings to the set of supported configuration options may include comparing the set of configuration settings to the set of supported combinations.

In any implementations, the accessing step may include accessing the data from a buffer that stores a copy of traffic associated with one or more calls between the SIP trunk and a telephone network. The determining step may include determining the set of configuration settings based on the data from the buffer.

In any implementations, the step of determining the configuration status may occur at a host computer operable to interconnect the SIP trunk and a telephone network.

The present disclosure may include any one or more of the individual features disclosed above and/or below alone or in any combination thereof.

The various features and advantages of an example embodiment will become apparent to those skilled in the art from the following detailed description. The drawings that accompany the detailed description can be briefly described as follows.

DETAILED DESCRIPTION

Distributed telephony systems are interconnected using a technology called SIP trunks. The SIP trunk may be associated with many configuration options. Some options may be compatible with other options, but some options may be incompatible. If the options are incompatible then calls may not function as intended or may completely fail to connect.

For example, there may be several ways to configure a SIP trunk for caller identification (ID). If a call is made in the wrong format, then the recipient may not receive caller ID associated with an incoming call or may not accept the call.

Troubleshooting these connections can be resource intensive or otherwise challenging for various reasons. It may be difficult to determine why a connection is failing to be established. An SIP administrator may not be aware of the incompatibilities when configuring the SIP server. Systems utilized to establish the SIP trunk may be managed by different individuals, often in different companies. Therefore, multiple individuals may be involved in diagnosing these issues. Communications encrypted using an encryption protocol, such as the transportation layer security (TLS) protocol, may present additional challenges by obscuring the communication when attempting to determine connectivity issues across the SIP trunk.

The disclosed techniques may be utilized to assist in diagnosing a configuration of a SIP trunk. A configuration status may be determined. The configuration status may be displayed in a graphical user interface (GUI). The user may interact with the user interface to determine configuration incompatibilities and other issues that may cause communications across the SIP trunk to at least partially or completely fail.

Figure 1:
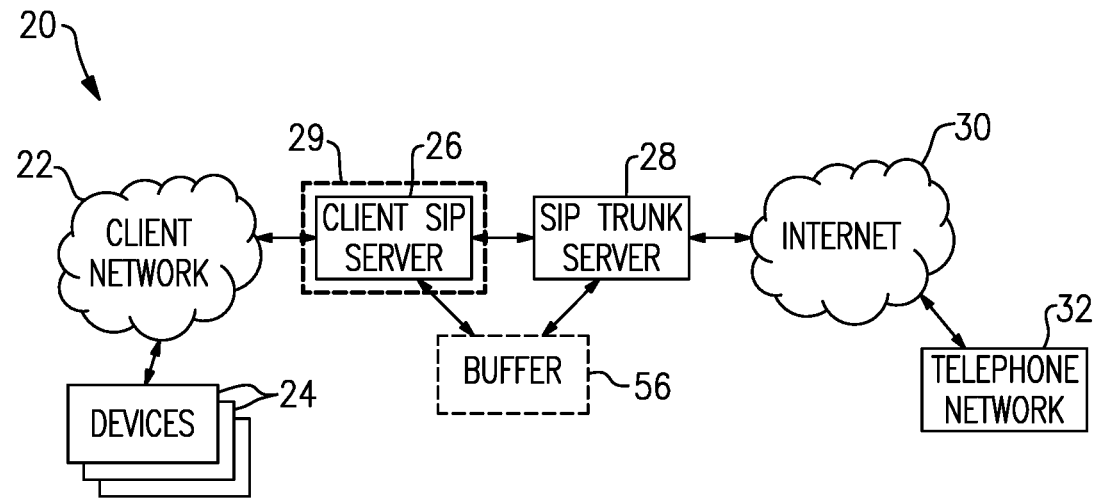
FIG. 1 schematically illustrates a communications system.

FIG. 1 schematically discloses a communication system 20 according to an implementation. The system 20 may include a client network 22 operable to interconnect one or more computing devices 24, such as one or more Voice over IP (VoIP) phones, laptops, desktops, etc. The client network 22 may be established by one or more networking devices, such as servers, routers, switches, etc.

The system 20 may include one or more (e.g., client) SIP servers 26 and one or more (e.g., host) SIP trunk servers 28. The client server 26 and/or trunk server 28 may be operable to establish one or more SIP trunks 29. The SIP trunk server 28 may include a session border controller (SBC), SIP gateway, etc. The SIP trunk server 28 may be linked to or otherwise may have access to a telephone network 32. The telephone network 32 may include known equipment to facilitate calls in a known manner. The telephone network 32 may support one or more phone numbers. The SIP trunk server 28 may be operable to interconnect the client server 26 and the telephone network 32 via the internet 30. The host server 28 may be remote from the SIP trunk 29. The client server 26 may be operable to interconnect the trunk 29 and the telephone network 32. For every incoming or outgoing phone call across the trunk 29, one SIP channel may be established. The SIP channel may support one or more calls conducted at different times.

Figure 2:
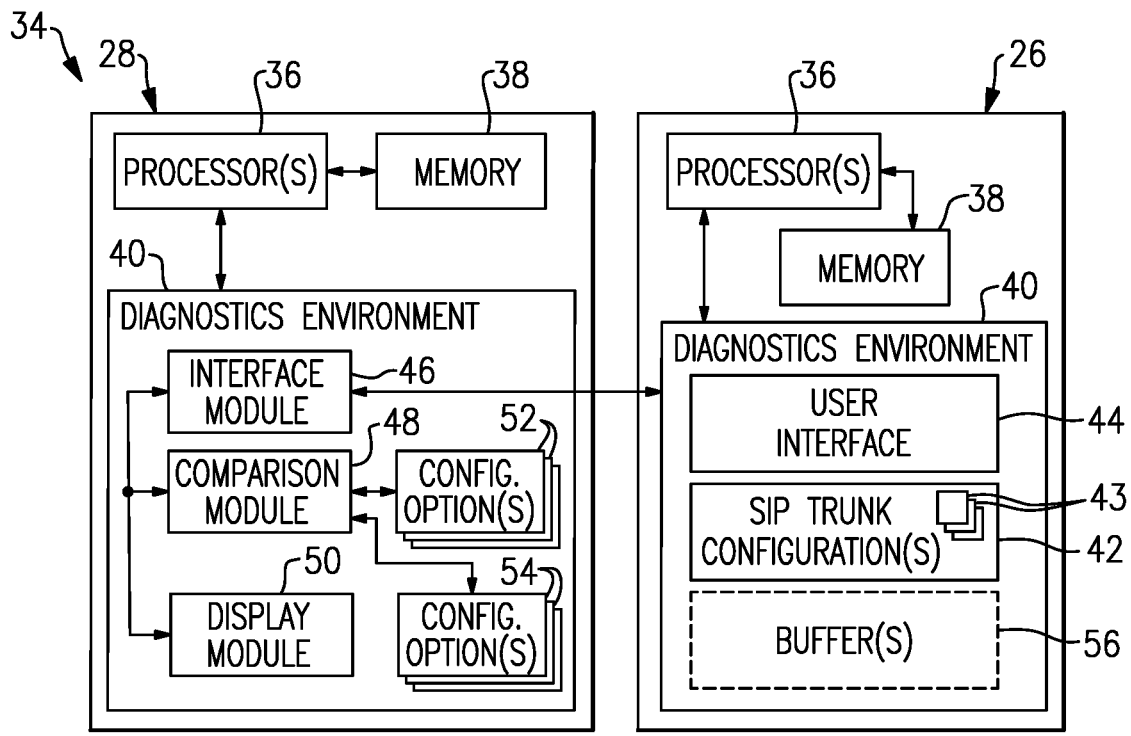
FIG. 2 discloses a system for establishing a SIP trunk.

Referring to FIG. 2, with continuing reference to FIG. 1, a system 34 for establishing a SIP trunk is disclosed. The system 34 may be incorporated into the system 20. The system 20 may be operable to establish VoIP communications across the SIP trunk 29. The system 34 may include the client server 26 and/or the trunk server 28.

The servers 26, 28 may include one or more computing devices. Each computing device may include one or more computer processors, memory, storage means, network devices, input and/or output devices, and/or interfaces. The computing devices may be operable to execute one or more software programs, the functionality of this description. The computing devices may be operable to communicate with one or more networks established by one or more computing devices. The memory may include UVPROM, EEPROM, FLASH, RAM, ROM, DVD, CD, a hard drive, or other computer readable medium which may store data and/or the functionality of this description. The computing devices may be a desktop computer, laptop computer, smart phone, tablet, or any other computer device. Input devices may include a keyboard, mouse, touchscreen, etc. The output devices may include a monitor, speakers, printers, etc. Each of the computing devices may include one or more processors coupled to memory. The computing devices may be coupled to each other by connection(s). The connection may be a wired and/or wireless connection. The connection may be established over one or more networks and/or other computing systems.

The system 34 may be utilized to diagnose a SIP trunk configuration of the SIP trunk 29. In implementations, each of the servers 26, 28 may include one or more processors 36 coupled to memory 38. The processor(s) 36 may be collectively operable to execute a diagnostics environment 40. The diagnostics environment 40 may be operable to configure and/or diagnose one or more SIP trunk configurations 42 associated with respective trunk(s) 29. The trunk configuration 42 may include a set of configuration settings 43 assignable to the trunk 29. The client server 26 and/or trunk server 28 may be operable to establish the trunk 29 according to the trunk configuration 42 and associated configuration settings 43. The set of configurations settings 43 may be associated with respective layers and/or sublayers of a network connectivity model. The set of configurations settings 43 may be selectable from respective groups of configuration options 52. The configuration options 52 may collectively establish different configuration profiles associated with the hardware and/or software associated with the trunk 29. Some of the configuration options 52 may be compatible with each other, but some of the configuration options 52 may be incompatible with each other or may not be supported by the trunk server 28. The trunk server 28 may support fewer than all configuration options 52. Some configuration options 52 from different groups of the configuration options 52 may be incompatible with each other, even though the incompatible configuration options 52 may be selectable by the SIP administrator or other user.

Various network connectivity models may be utilized in accordance with the teachings disclosed herein. The network connectivity model may be a standard model including the Open Systems Interconnection (OSI) model or a variation of the OSI model, such as the transmission control protocol (TCP)/internet protocol (IP) model. The OSI model is known and describes seven layers that computer systems may use to communicate over a network. The seven layers of the OSI model include: (1) physical; (2) data-link; (3) network; (4) transport; (5) session; (6) presentation; and (7) application. The TCP/IP model is known and includes four layers. The four layers of the TCP/IP model include: (1) network (e.g., physical and data-link); (2) internet; (3) transport; and (4) application (e.g., session, presentation and application). The TLS protocol may be a security protocol associated with the session layer.

The diagnostics environment 40 may be executed on the trunk server 28 and/or client server 26. Portions of the diagnostics environment 40 may be distributed between the trunk server 28 and/or client server 26. In implementations, the trunk server 28 may be operable to execute the diagnostics environment 40 and the client server 26 may interact with the diagnostics environment 40 through a thin-client or web browser to determine a status of the trunk 29.

Figure 3:
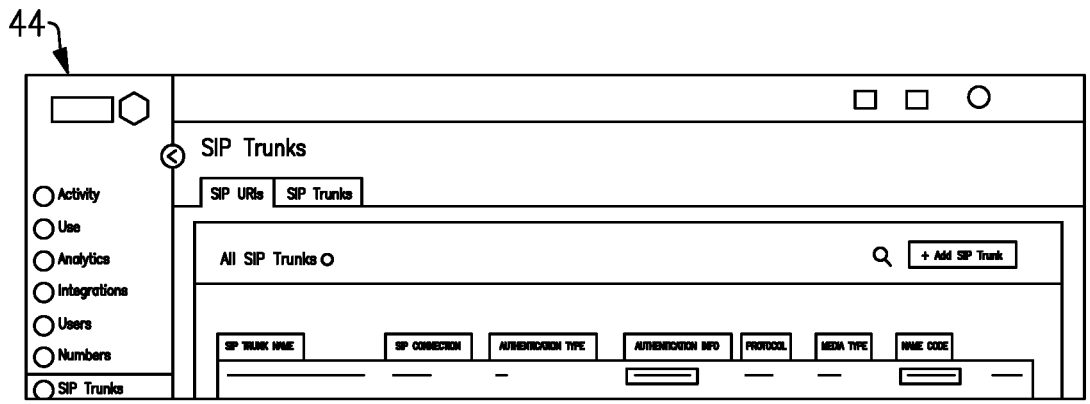
FIG. 3 discloses a graphical user interface for adding and/or configuring a SIP trunk.

[own] The client server 26 may include a graphical user interface 44 operable to establish one or more trunks 29 associated with respective SIP trunk configurations 42. An implementation of the user interface 44 is disclosed in FIGS. 3-4. The client SIP administrator may interact with the user interface 44 to add and/or configure the trunk(s) 29 to establish a respective trunk configuration 42.

The diagnostics environment 40 may include one or more modules for evaluating the trunk configuration(s) 42. The diagnostics environment 40 may include an interface module 46, a comparison module 48 and/or a display module 50. Although three modules are disclosed, fewer or more than three modules may be utilized to provide the disclosed functionality.

The interface module 46 may be operable to access data associated with the trunk configuration(s) 42. The data may be stored in one or more messaging buffers 56. The buffer 56 may be established in memory 38 and/or another memory location. The interface module 46 may be operable to access data from the buffer 56. The buffer(s) 56 may be established by the client server 26 and/or the trunk server 28. The interface module 46 may be operable to access the data in response to initiation of at least one call associated with the trunk 29. The data may be associated with at least one call and/or other event between the trunk 29 and the telephone network 32. The call may be initiated by the client server 26 and/or one of the client devices 24. A copy of the data may be stored in the buffer(s) 56. The diagnostics environment 40 and/or client server 26 may be operable to store the data in the buffer(s) 56. The buffer 56 may be operable to store a copy of traffic associated with one or more calls and/or other events between the trunk 29 and the telephone network 32 and/or another device connected to the internet 30.

The comparison module 48 may be operable to access a set of supported configuration options 54. The supported configuration options 54 may be associated with the respective layers and/or sublayers of the network connectivity model. The configuration options 52 may include at least the supported configuration options 54. The set of supported configuration options 54 may be associated with fewer than all configuration options 52 of the respective groups of configuration options 52. The groups of configuration options 52 may define a set of selectable combinations associated with two or more of the layers and/or sublayers of the network connectivity model. The set of supported configuration options 54 may define a set of supported combinations associated with two or more of the layers and/or sublayers of the network connectivity model. The set of supported combinations may be fewer than all selectable combinations of the set of selectable combinations of the configuration options 52.

The comparison module 48 may be operable to determine a (e.g., present) configuration status of one or more of the layers and/or sublayers associated with the trunk 29 in response to comparing the set of configuration settings 43 to the set of supported configuration options 54. In implementations, all possible configuration options 52 may not be known by the comparison module 48 when determining the configuration status. The comparison module 48 may be operable to determine the configuration status in response to comparing the set of configuration settings 43 to the set of supported combinations of the supported configuration options 54. In other implementations, the trunk configuration 42 may be accessible by and/or communicated to the comparison module 48 such that the trunk configuration 42 may be known to the comparison module 48. In implementations, one or more rules may be established to determine whether combinations of the configuration options 52 are supported or may otherwise be suboptimal. The diagnostics screen 58 may be arranged to identify unsupported and/or suboptimal combinations. For example, a low bandwidth codec (e.g., G729) without explicit dual-tone multi-frequency (DTMF) support (phone keys 0-9) may not be supported due to low audio quality not reliably passing the audio of the button press, whereas selection of another codec (e.g., G711) may be supported. As another example, configuring the SIP trunk 29 to pass audio encryption keys in unencrypted signaling may not be supported.

Figure 4:
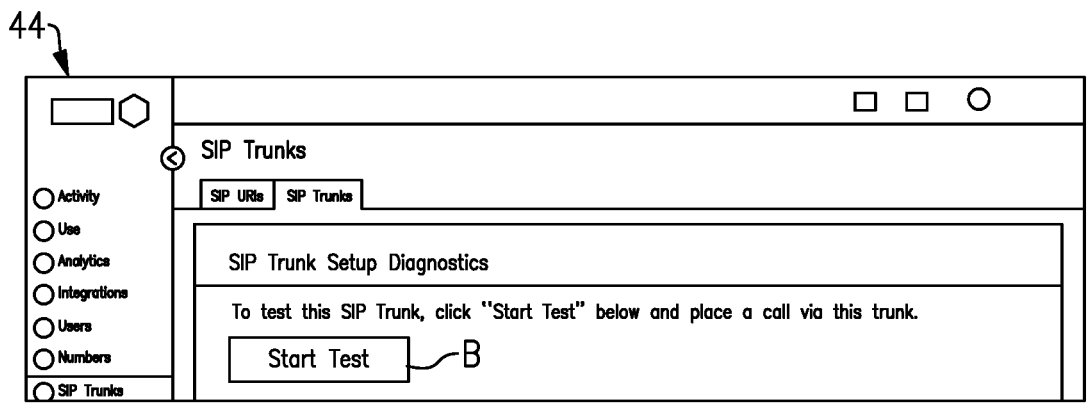
FIG. 4 discloses a portion of the graphical user interface that may be utilized to test a SIP trunk configuration.

Referring to FIG. 4, with continuing reference to FIGS. 1-2, the SIP trunk administrator and/or another user may interact with the user interface 44 to conduct a diagnostics test. In implementations, the user may select a button B to initiate the diagnostics test. Initiating the diagnostics test may cause the diagnostics environment 40 to enter into a diagnostics mode. The diagnostics environment 40 may be operable to store data associated with the SIP trunk 29 in the buffer(s) 56 and/or another memory location during the diagnostics mode. The comparison module 48 may be operable to determine the set of configuration settings 43 based on the data in the buffer 56.

Figure 5:
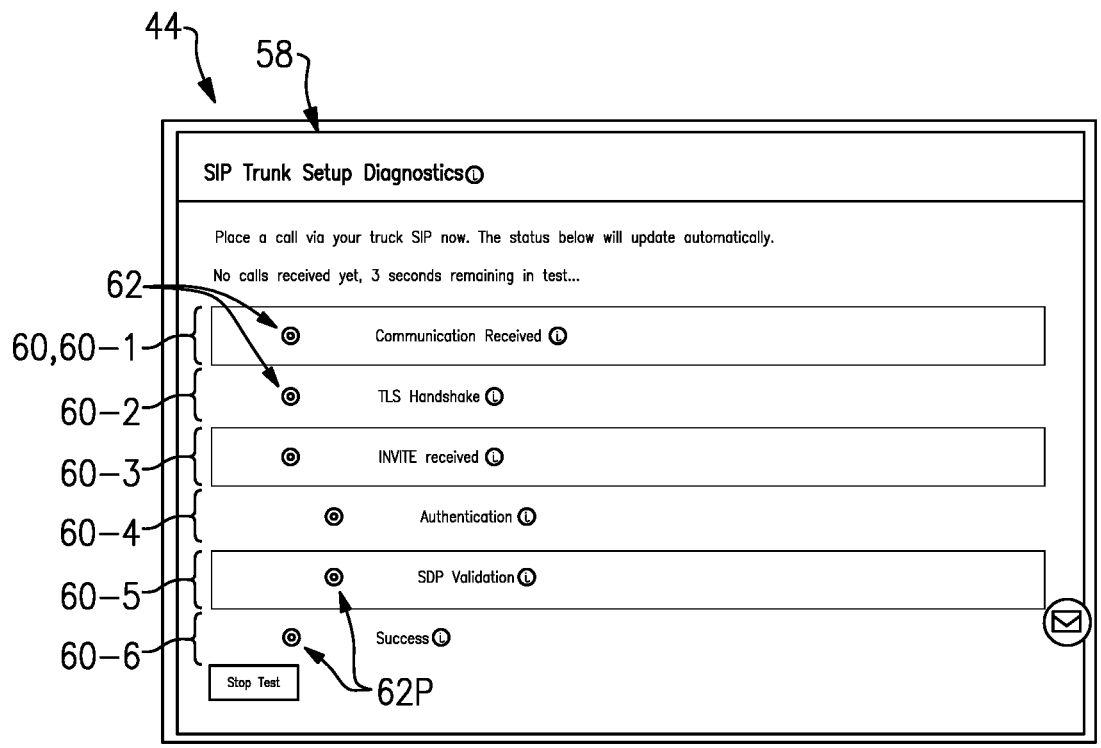
FIGS. 5-8 disclose various implementations of a diagnostics screen of the user interface.

Referring to FIG. 5, with continuing reference to FIGS. 1-2, the user interface 44 may include diagnostics screen(s) 58. The diagnostics screen 58 may be operable to display information associated with a configuration and/or status of the SIP trunk 29. The diagnostics screen 58 may be operable to display various information to the user, including the IP address of an incoming (or outgoing) call and information associated with the trunk configuration 42.

The display screen 58 may be established utilizing various techniques. The diagnostics screen 58 may include a list. The list may be associated with the layers and/or sublayers of the network connectivity model.

The display screen 58 may include a set of localized regions 60. The localized regions 60 may be associated with the respective layers and/or sublayers of the network connectivity model, which may be arranged in rows to visually depict the list. In the implementation of FIG. 5, the display screen 58 may include six localized regions 60-1 to 60-6. It should be understood that fewer or more than six localized regions 60 may be utilized in accordance with the teachings disclosed herein. The set of localized regions 60 may be arranged according to an order of layers and/or sublayers of the network connectivity model. The display module 50 may be operable to display a (e.g., call) identifier 61 in the user interface 44 (e.g., FIGS. 7-8). The identifier 61 may be associated with a call initiated during the diagnostics mode.

The layers associated with the localized region 60 may include a communications layer, a TLS layer, and an invitation layer associated with localized regions 60-1 to 60-3, respectively. The invitation layer may include one or more sublayers (e.g., components) such as an authentication sublayer and a session description protocol (SDP) validation sublayer, which may be associated localized regions 60-4, 60-5. It should be understood that localized regions 60 may be established for any of the layers and/or sublayers of the network connectivity model.

Figure 6:
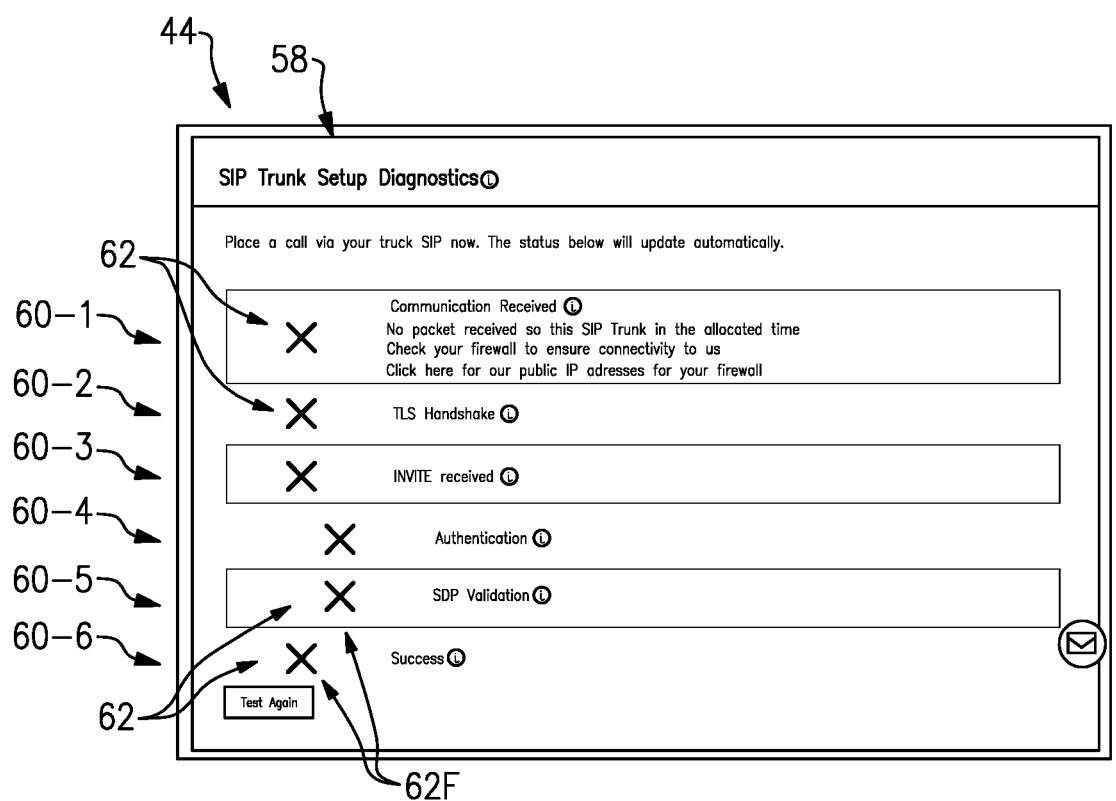
Figure 7:
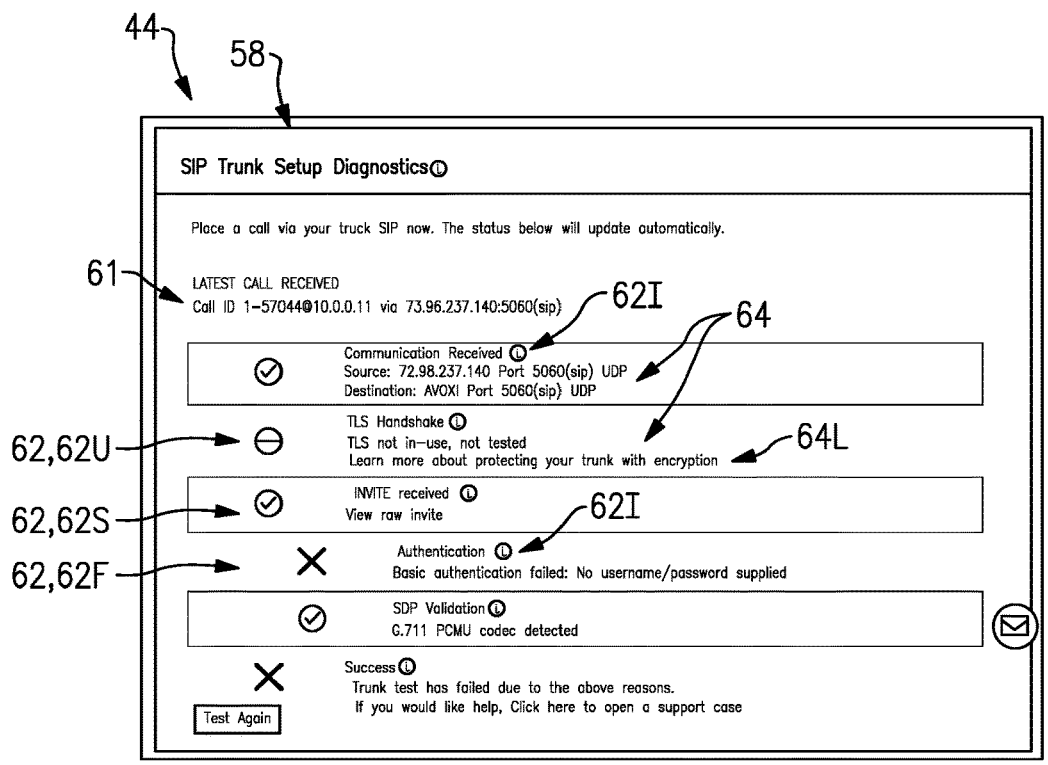
Figure 8:
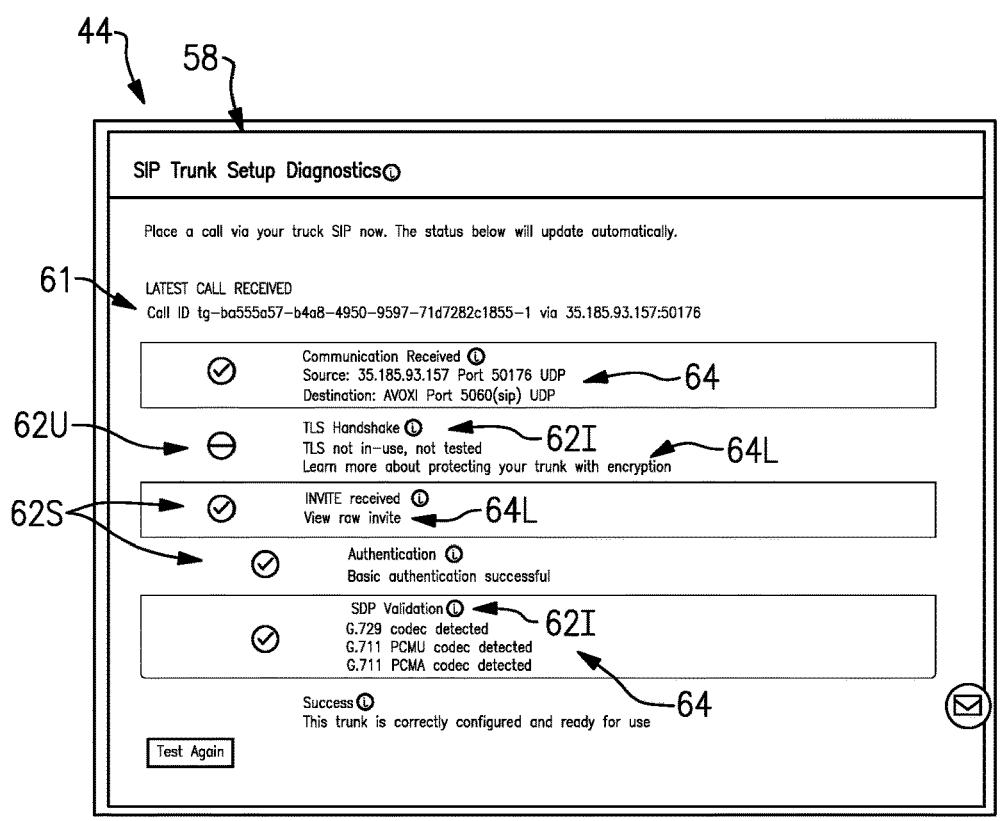

Referring to FIGS. 6-8, with continuing reference to FIGS. 1-2 and 5, the display module 50 may be operable to cause the configuration status to be displayed in the user interface 44. The configuration status may be displayed as one or more (e.g., graphical) indicators 62. The display module 50 may be operable to cause display of the indicator(s) 62. The indicators 62 may be associated with the configuration status of respective layers and/or sublayers in the diagnostics screen 58 and/or another portion of the user interface 44. The indicators 62 may include one or more indicators 62I associated with the layers and/or sublayers of the network connectivity model. The indicators 62I may be linked to various help menus and other information.

The indicators 62 may be selectable from a set of indicator types. The indicator types may include a pending indicator 62P (e.g., FIG. 5), a failure indicator 62F (e.g., FIGS. 6-7), a success indicator 62S (e.g., FIGS. 7-8) and/or an unused indicator 62U (e.g., FIGS. 7-8).

The indicators 62 may be associated with one or more respective text fields 64. The display module 50 may be operable to cause display of text in the text fields 64, which may be associated with the set of supported configuration options 54 and/or other (e.g., unsupported) configuration options 52. The text fields 64 may include one or more links 64L for accessing information associated with the supported configurations 54.

For example, the call information may be associated with a codec. Codecs are known and may be utilized to encode or decode a data stream or signal. The trunk server 28 may only support a limited set of codecs, such as only three codecs (e.g., G.711 PCMU codec). If the trunk 29 is not configured according to a supported codec, then a call may be rejected. The incompatible setting may be indicated by a failure indicator 62U in the diagnostics screen 58, such as with an "X" icon. The diagnostics environment 40 may be operable to indicate that the selected codec is not supported and may display a listing of supported codecs (e.g., codecs A, B, C) in the text field(s) 64. The diagnostics environment 40 may be operable to indicate that the codec is supported by a success indicator 62S in the diagnostics screen 58, such as with a check mark ("✓") icon.

Figure 9:
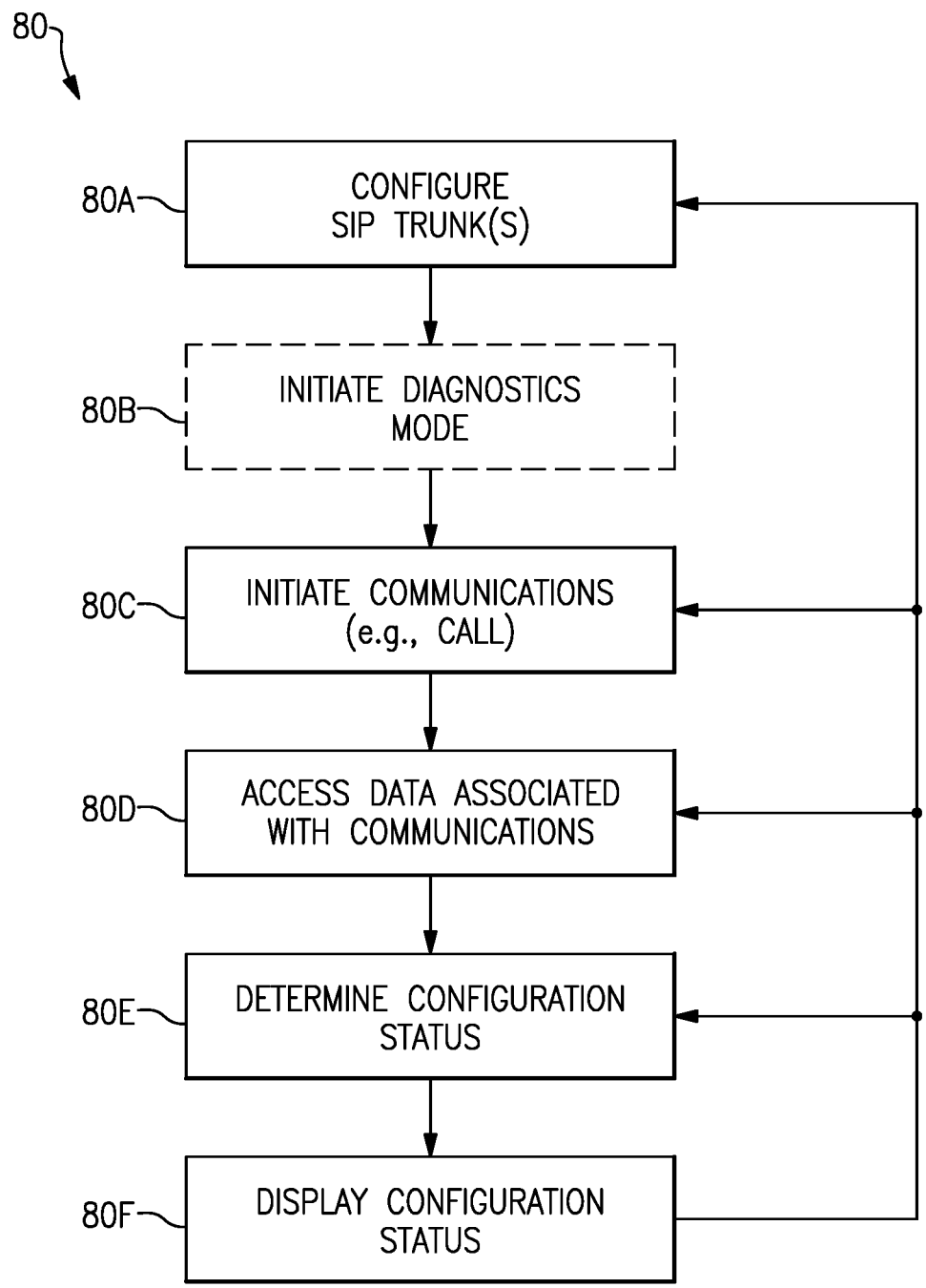
FIG. 9 discloses a method of diagnosing a SIP trunk configuration.

FIG. 9 discloses a method of configuring and/or diagnosing a SIP trunk configuration in a flow chart 80 according to an implementation. The method 80 may be utilized to diagnose various SIP trunk configurations, including configurations that may be incompatible or may not be supported by a SIP trunk server. Fewer or additional steps than are recited below could be performed within the scope of this disclosure, and the recited order of steps is not intended to limit this disclosure. The diagnostics environment 40 may be programmed with logic for performing method 80. Reference is made to the system 20.

Referring to FIGS. 1-2, with continuing reference to FIG. 9, one or more SIP trunks 29 may be configured at step 80A. The SIP trunk 29 may be configured utilizing any of the techniques disclosed herein. The SIP trunk 29 may be defined according to a configuration 42 including a set of configuration settings 43. The configuration settings 43 may be associated with respective layers and/or sublayers of a network connectivity model. The set of configuration settings 43 may be selectable from respective groups of configuration options 52. Each group of configuration options 52 may be associated with a single layer or sublayer of the network connectivity model. Some of the configuration options 52 may be supported by the trunk server 28, but some may not be supported.

At step 80B, a diagnostics (e.g., troubleshooting) mode may be initiated. Step 80B may include initiating storage of data associated with the SIP trunk 29 in memory, such as the buffer(s) 56. The data may be copied to the buffer 56. The buffer 56 may be operable to store a copy of calls, events and/or other communications across the trunk 29. In implementations, an end user such as a client SIP administrator may interact with the user interface 44 to initiate the diagnostic mode. The diagnostics environment 40 may be operable to connect to the buffer 56 and consume events (e.g., calls) associated with the trunk 29.

At step 80C, communications may be initiated. Step 80C may include attempting to communicate over the trunk 29. The communications may include one or more calls between the client server 26 and one or more devices associated with the telephone network 32. The call may be initiated with a VoIP phone and/or another computing device.

At step 80D, data associated with the trunk 29 may be accessed. In implementations, step 80D may include accessing the data from the buffer(s) 56. The data may correspond to actual and/or virtual call activity during the diagnostics mode. The buffer 56 may store a copy of traffic associated with one or more calls between the trunk 29 and telephone network 32.

At step 80E, a (e.g., present) configuration status of the trunk 29 may be determined. The configuration status may be determined by various devices of the system 20. In implementations, the configuration status may be determined by a host computer operable to interconnect the trunk 29 and telephone network 32, such as the SIP trunk server 28. In other implementations, the configuration status may be determined by the client SIP server 26. The configuration status may be determined based on the data accessed at step 80D. Step 80E may include comparing the set of configuration settings 43 to the set of supported configuration options 54. The set of supported configuration options 54 may be associated with respective layers and/or sublayers of the network connectivity model. The set of supported configuration options 54 may be associated with fewer than all configuration options 52 of the respective groups of configuration options 52.

The configuration settings 43 may be determined utilizing various techniques. Step 80E may include determining the set of configuration settings 43 based on the data from the buffer(s) 56. The manner in which the trunk 29 interfaces with the trunk server 28 may be utilized to determine the trunk configuration 42, even though the trunk server 28 may not know the selected configuration 42 at the trunk 29. Step 80E may include evaluating packet information of the respective communications, which may be stored as data in the buffer(s) 56.

The groups of configuration options 52 may define a set of selectable combinations associated with two or more layers and/or sublayers of the network connectivity model. The set of supported configuration options 54 may define a set of supported combinations associated with two or more of the layers and/or sublayers. The set supported combinations may be fewer than all selectable combinations of the set of selectable combinations of all the configuration options 52. Comparing the set of configuration settings 43 to the set of supported configuration options 54 may include comparing the set of configuration settings 43 to the set of supported combinations and/or unsupported combinations.

At step 80F, the configuration status may be displayed in the user interface 44. The configuration status may be displayed utilizing any of the techniques disclosed herein. In implementations, the configuration status may be displayed as one or more (e.g., graphical) indicators 62. The indicators 62 may be associated with the configuration status of respective layers and/or sublayers in the diagnostics screen 58 and/or another portion of the user interface 44. Events associated with data in the buffer 56 may be displayed in the user interface 44 with one or more indicators 62. The indicators 62 may be associated with configurations that may cause a partial and/or complete failure of calls and other communications across the trunk 29, which may be initiated at step 80C. Step 80F may include displaying the configuration status of the layers and/or sublayers associated with the trunk 29 in the user interface 44. Step 80F may include updating the indicators 62 according to the determined configuration status. Step 80F may include displaying information in text fields 64 in respective localized regions 60 of the diagnostics screen 58 associated with the determined configuration status. The information in the text fields 64 may be associated with one or more of the supported configuration options 54 and/or unsupported configuration options 52. The client SIP administrator or other user may interact with the user interface 44 utilizing various techniques. In implementations, the user may log on to the SIP trunk server 28 using a browser, which may be operable to deliver the configuration status presented in the user interface 44.

The method 80 may include repeating any of the steps, including step 80A, 80C, 80D, 80E and/or 80F. In implementations, determining the configuration status at step 80E and/or displaying the configuration status 80E may be repeated for one or more iterations in response to one or more changes in the set of configuration settings 43. The change(s) may occur in response to re-configuring the SIP trunk 29 at step 80A.

The disclosed techniques may be utilized to diagnose and remedy configuration issues that may arise during configuration of a SIP trunk. A customer or another user may be guided visibly through the configuration process, which may reduce configuration time for the SIP trunk. The user may need relatively less assistance from the SIP trunk server administrator. A single person, such as the customer SIP administrator, may perform the diagnostics by interacting with the user interface.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

What is claimed is:

1. A system for diagnosing a session initiation protocol (SIP) trunk configuration, the system comprising:
   one or more processors coupled to memory, wherein the one or more processors are collectively operable to execute a diagnostics environment, and the diagnostics environment comprising:
   an interface module operable to access data associated with a configuration including a set of configuration settings assignable to a SIP trunk, wherein the set of configurations settings are associated with respective layers and/or sublayers of a network connectivity model, and the set of configurations settings are selectable from respective groups of configuration options;
   a comparison module operable to access a set of supported configuration options associated with the respective layers and/or sublayers of the network connectivity model, and wherein the set of supported configuration options are associated with fewer than all configuration options of the respective groups of configuration options;
   wherein the comparison module is operable to determine a configuration status of one or more of the layers and/or sublayers associated with the SIP trunk in response to comparing the set of configuration settings to the set of supported configuration options; and
   a display module operable to cause the configuration status to be displayed in a user interface.

2. The system as recited in claim 1, wherein the interface module is operable to access the data in response to initiation of at least one call associated with the SIP trunk.

3. The system as recited in claim 1, wherein the user interface includes a list associated with the layers and/or sublayers, and the display module is operable to cause the display of one or more indicators associated with the configuration status of the respective layers and/or sublayers in the user interface.

4. The system as recited in claim 3, wherein the one or more indicators are selectable from a set of indicator types, the indicator types including a success indicator and a failure indicator.

5. The system as recited in claim 3, wherein the one or more indicators are associated with one or more respective text fields, and the display module is operable to cause display of text in the one or more text fields associated with the set of supported configuration options.

6. The system as recited in claim 1, wherein:
   the groups of configuration options define a set of selectable combinations associated with two or more of the layers and/or sublayers;
   the set of supported configuration options defines a set of supported combinations associated with two or more of the layers and/or sublayers, the set of supported combinations being fewer than all selectable combinations of the set of selectable combinations; and
   the comparison module is operable to determine the configuration status in response to comparing the set of configuration settings to the set of supported combinations.

7. The system as recited in claim 1, wherein the interface module is operable to access the data from a buffer, and the buffer is operable to store a copy of traffic associated with one or more calls between the SIP trunk and a telephone network.

8. The system as recited in claim 7, wherein the comparison module is operable to determine the set of configuration settings based on the data in the buffer.

9. The system as recited in claim 1, wherein the one or more processors are associated with a host computer, and the host computer is remote from the SIP trunk.

10. The system as recited in claim 9, wherein the host computer is operable to interconnect the SIP trunk and a telephone network.

11. A method of diagnosing a session initiation protocol (SIP) trunk configuration comprising:

accessing data associated with a SIP trunk, the SIP trunk defined according to a configuration including a set of configuration settings associated with respective layers and/or sublayers of a network connectivity model, the set of configuration settings selectable from respective groups of configuration options;

determining a configuration status of the SIP trunk based on the data, including comparing the set of configuration settings to a set of supported configuration options, the set of supported configuration options associated with the respective layers and/or sublayers of the network connectivity model, and wherein the set of supported configuration options are associated with fewer than all configuration options of the respective groups of configuration options; and displaying the configuration status of the layers and/or sublayers associated with the SIP trunk in a user interface.

12. The method as recited in claim 11, wherein the data is associated with at least one call between the SIP trunk and a telephone network.

13. The method as recited in claim 11, wherein the user interface includes a set of localized regions associated with the respective layers and/or sublayers, and the displaying step includes updating indicators associated with the respective localized regions according to the determined configuration status.

14. The method as recited in claim 13, wherein the set of localized regions are arranged according to an order of layers and/or sublayers of the network connectivity model.

15. The method as recited in claim 13, wherein the displaying step includes displaying information in text fields in the respective localized regions associated with the determined configuration status.

16. The method as recited in claim 15, wherein the information in the text fields is associated with one or more of the supported configuration options.

17. The method as recited in claim 11, further comprising repeating the determining and displaying steps in response to a change in the set of configuration settings.

18. The method as recited in claim 11, wherein:

the groups of configuration options define a set of selectable combinations associated with two or more of the layers and/or sublayers;

the set of supported configuration options defines a set of supported combinations associated with two or more of the layers and/or sublayers, the set supported combinations being fewer than all selectable combinations of the set of selectable combinations; and the step of comparing the set of configuration settings to the set of supported configuration options includes comparing the set of configuration settings to the set of supported combinations.

19. The method as recited in claim 11, wherein:

the accessing step includes accessing the data from a buffer that stores a copy of traffic associated with one or more calls between the SIP trunk and a telephone network; and the determining step includes determining the set of configuration settings based on the data from the buffer.

20. The method as recited in claim 11, wherein the step of determining the configuration status occurs at a host computer operable to interconnect the SIP trunk and a telephone network.

* * * * *